(12) United States Patent
Staynov

(10) Patent No.: US 10,031,225 B2
(45) Date of Patent: Jul. 24, 2018

(54) METHOD FOR DISTINGUISHING BETWEEN REAL OBSTACLES AND APPARENT OBSTACLES IN A DRIVER ASSISTANCE SYSTEM FOR MOTOR VEHICLE

(71) Applicant: Robert Bosch GmbH, Stuttgart (DE)

(72) Inventor: Venelin Staynov, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 351 days.

(21) Appl. No.: 14/897,579

(22) PCT Filed: Apr. 16, 2014

(86) PCT No.: PCT/EP2014/057696
§ 371 (c)(1),
(2) Date: Dec. 10, 2015

(87) PCT Pub. No.: WO2014/198441
PCT Pub. Date: Dec. 18, 2014

(65) Prior Publication Data
US 2016/0139262 A1 May 19, 2016

(30) Foreign Application Priority Data
Jun. 12, 2013 (DE) .......................... 10 2013 210 928

(51) Int. Cl.
*G01S 13/93* (2006.01)
*B60K 31/00* (2006.01)
(Continued)

(52) U.S. Cl.
CPC ........ *G01S 13/931* (2013.01); *B60K 31/0008* (2013.01); *B60T 7/12* (2013.01);
(Continued)

(58) Field of Classification Search
USPC ..................................................... 342/70–72
See application file for complete search history.

(56) References Cited

U.S. PATENT DOCUMENTS

| 6,687,577 B2 * | 2/2004 | Strumolo ............... G08G 1/165 342/70 |
| 7,362,259 B2 * | 4/2008 | Gottwald ............... H01Q 1/325 342/159 |

(Continued)

FOREIGN PATENT DOCUMENTS

| DE | 103 35 898 | 3/2005 |
| EP | 2 023 158 | 2/2009 |

(Continued)

OTHER PUBLICATIONS

International Search Report for PCT/EP2014/057696, dated Aug. 22, 2014.

*Primary Examiner* — Marcus E Windrich
(74) *Attorney, Agent, or Firm* — Norton Rose Fulbright US LLP; Gerard Messina

(57) ABSTRACT

In a method for distinguishing between real obstacles and apparent obstacles using a driver assistance system for motor vehicles equipped with a position finding system for determining one's own location, as well as a radar sensor for measuring the distances and relative velocities of radar targets, positional information for radar targets recognized as apparent obstacles is stored in a database, and when the driver assistance system recognizes a stationary radar target at a specific location, the driver assistance system queries the database whether an apparent obstacle is stored for this location.

12 Claims, 2 Drawing Sheets

(51) Int. Cl.
*B60T 7/12* (2006.01)
*B60W 30/14* (2006.01)
*G08G 1/16* (2006.01)
*B60T 7/22* (2006.01)
*G01S 13/86* (2006.01)

(52) U.S. Cl.
CPC ............... *B60T 7/22* (2013.01); *B60W 30/14* (2013.01); *G01S 13/86* (2013.01); *G08G 1/165* (2013.01); *B60T 2201/022* (2013.01); *B60T 2210/36* (2013.01); *G01S 2013/9346* (2013.01)

(56) References Cited

U.S. PATENT DOCUMENTS

| | | | | |
|---|---|---|---|---|
| 7,379,014 B1* | 5/2008 | Woodell | ............... | G01S 13/87 342/29 |
| 7,903,021 B2* | 3/2011 | Aso | ............... | B60W 40/02 342/27 |
| 8,447,437 B2* | 5/2013 | Chiang | ............... | G08G 1/165 340/435 |
| 8,477,063 B2* | 7/2013 | Meyers | ............... | G01S 7/411 342/118 |
| 8,483,906 B2* | 7/2013 | Lucas | ............... | B60T 8/174 180/410 |
| 8,612,129 B2* | 12/2013 | Gagliardi | ............... | G08G 3/02 701/300 |
| 8,630,795 B2* | 1/2014 | Breed | ............... | G01C 21/3697 123/352 |
| 8,730,089 B2* | 5/2014 | Shimizu | ............... | G01S 13/931 342/118 |
| 8,768,568 B2* | 7/2014 | Uhlmann | ............... | B61L 29/24 340/901 |
| 8,773,286 B1* | 7/2014 | Friend | ............... | G05D 1/0225 340/435 |
| 8,825,266 B2* | 9/2014 | Naderhirn | ............... | G08G 5/045 342/109 |
| 2006/0149452 A1 | 7/2006 | Sawamoto et al. | | |
| 2010/0152967 A1 | 6/2010 | Murphy et al. | | |
| 2012/0271540 A1* | 10/2012 | Miksa | ............... | G01C 21/30 701/409 |
| 2013/0321176 A1* | 12/2013 | Vasek | ............... | G08G 5/04 340/945 |

FOREIGN PATENT DOCUMENTS

| | | |
|---|---|---|
| JP | 2003175810 A | 6/2003 |
| JP | 2006201942 A | 8/2006 |
| JP | 2010 072 947 | 4/2010 |
| JP | 2010072947 A | 4/2010 |
| JP | 2011018214 A | 1/2011 |

* cited by examiner

METHOD FOR DISTINGUISHING BETWEEN REAL OBSTACLES AND APPARENT OBSTACLES IN A DRIVER ASSISTANCE SYSTEM FOR MOTOR VEHICLE

BACKGROUND OF THE INVENTION

1. Field of the Invention

The present invention relates to a method for distinguishing between real obstacles and apparent obstacles in a driver assistance system for motor vehicles equipped with a position finding system for determining one's own location, as well as a radar sensor for measuring distances and relative velocities of radar targets.

2. Description of the Related Art

Electronic driver assistance systems are known that assist the driver in controlling the vehicle, in particular on the basis of information provided by the radar sensor, for example, by issuing a warning or automatically triggering an intervention in the form of an emergency braking in response to an acute accident risk.

To ensure that such driver assistance systems improve road safety, it is important that incorrect interventions, such as false warnings or brake interventions that are unnecessary—and thus unexpected for any following traffic—be avoided to the greatest extent possible. This presupposes that the system be able to use the available information to reliably distinguish between real obstacles that require a warning or an intervention and apparent obstacles that the radar sensor does, in fact, detect, but are not real obstacles. Examples of such apparent obstacles are, for instance, metal manhole or sewer covers, cow grids and the like, which, however, because of the high reflectivity thereof to radar waves from the radar sensor, are not actual obstacles since the vehicle can easily drive over them. Due to the limited angular resolving power thereof, the customary radar sensors are not able to estimate the dimensions, in particular the height, and the exact position of the located object reliably enough to make these objects distinguishable from real obstacles, such as stationary vehicles and the like.

By comparing the relative velocity of a located object to the velocity of the host vehicle, the driver assistance system is able to distinguish between objects that are absolutely stationary (relative to the road surface) and those that are moving. In the case of moving objects on the road surface, whose relative velocity is negative (thus, which are approaching), it can generally be assumed that they are real obstacles. On the other hand, in the case of stationary radar targets, it is difficult to make the distinction. Evaluation algorithms have, in fact, been developed that make it possible to additionally check the plausibility of the obstacles. However, these algorithms are not reliable in all situations.

It is also known to consult data from additional sensors, for instance, the data from a video camera and a corresponding image processing system for plausibility checking or verification of obstacles. However, these more expensive evaluation methods require considerable computing power, respectively computing time.

BRIEF SUMMARY OF THE INVENTION

It is an object of the present invention to provide a method that will make it possible to distinguish more simply, more rapidly and more reliably between real obstacles and apparent obstacles.

This objective is achieved by storing positional information for radar targets recognized as apparent obstacles in a database, and by the driver assistance system, when it recognizes a stationary radar target at a specific location, querying the database whether an apparent obstacle is stored for this location.

The present invention utilizes the fact that most motor vehicles are equipped with a driver assistance system, today also with a position-finding system, for example, a GPS navigation system that makes it possible to determine the vehicle's own location. Using such a position-finding system, it is also possible to ascertain the locations of the objects recorded by the radar sensor at the current point in time accurately enough to allow them to be matched to the positional information stored in the database. If the database query reveals that an apparent obstacle is already stored for the location in question, then the currently located, stationary radar target may be reliably qualified as an apparent obstacle, making it possible to avoid a false warning or an incorrect intervention.

The database is preferably queried before further processing steps are carried out for more detailed plausibility checking or for verifying the recognized, stationary radar target. If the query reveals that the radar target is an apparent obstacle, it is then possible to dispense with further processing steps that entail considerable computational outlay.

It is even possible, during the drive, to search the database virtually continuously for apparent obstacles that are stored along the current route, making it possible for the radar target, when it is located by the radar sensor, to be immediately qualified as an apparent obstacle. In this case, the method may also be used for recognizing any potential blinding of the radar sensor and/or for checking the accuracy of the position-finding system.

The database, in which the apparent obstacles are stored, may be located on board the vehicle equipped with the driver assistance system. In such a case, new apparent obstacles may always be stored when the vehicle is traveling the route for the first time on which the apparent obstacle is located. The radar sensor then locates the apparent obstacle, and the driver assistance system may recognize that it is an apparent obstacle either on the basis of a failed verification or, at the latest, when the vehicle drives over the supposed obstacle. In this manner, the driver assistance system "learns" apparent obstacles present on any routes, preventing them from resulting in any future false warnings or incorrect interventions. Naturally, an apparent obstacle may likewise be stored if the driver assistance system has actually triggered a false warning or an incorrect intervention, and this had been corrected by an active intervention by the driver.

Another specific embodiment provides that the database not be on board the vehicle, rather on a server that communicates through a wireless communication network (mobile telephone system having Internet access, WLAN or the like) with the driver assistance system in the vehicle. In such a case, the location data of apparent obstacles, which had been recognized and reported by other vehicles, may also be available to the database, making substantially more complete information on the apparent obstacles available to all vehicles involved. Such information may already be used by a single vehicle when traveling the route in question.

It is particularly advantageous to combine the two variants described above, i.e., a database on a server at a fixed installation location that communicates with local databases on board the vehicles involved. The less comprehensive database on board the vehicle may be updated from time to time as a function of the current location of the vehicle, for example, even when there is a suitable data connection to the server.

In other respects, the method is not strictly limited to radar sensors, rather may also be used for Lidar systems, for example. An exemplary embodiment is explained in greater detail in the following, with reference to the drawing.

DETAILED DESCRIPTION OF THE INVENTION

Figure 1:
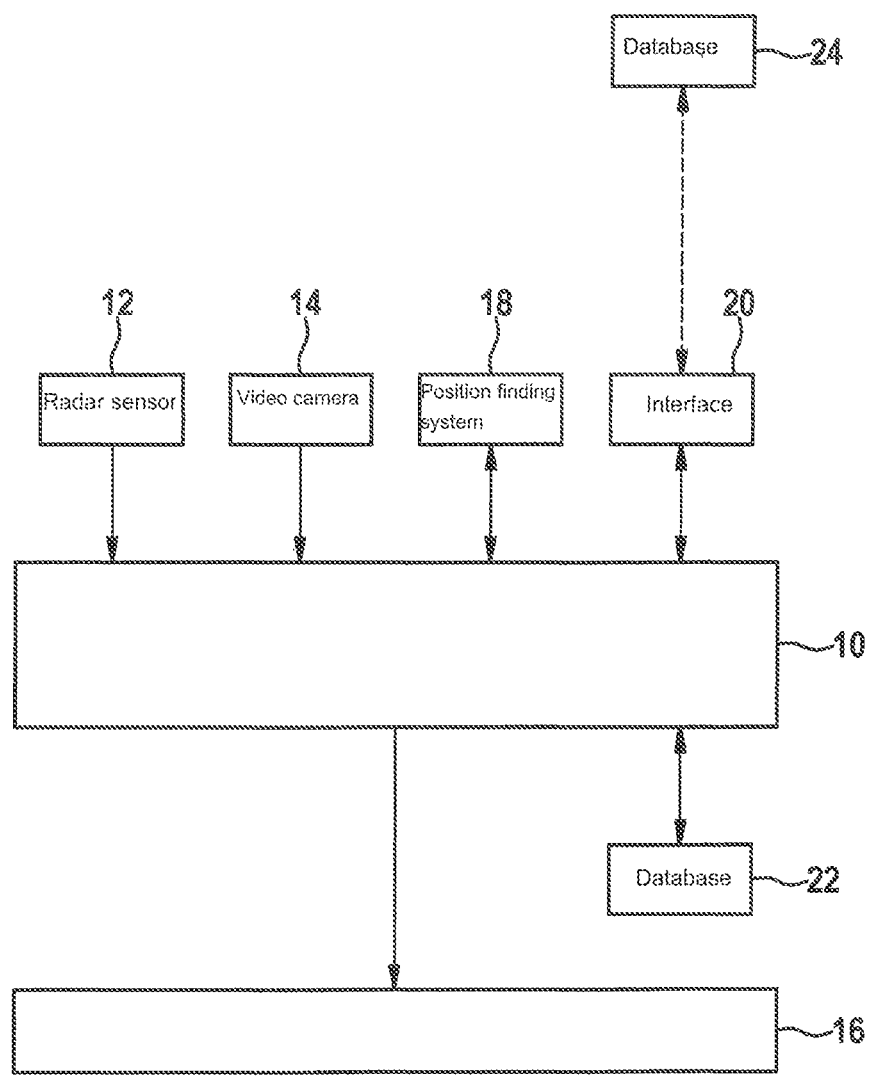
FIG. 1 shows a block diagram of a driver assistance system for motor vehicles.

The driver assistance system shown in FIG. 1 has an electronic control unit 10 having a processor or a plurality of processors that receive(s) and analyze(s) data from a radar sensor 12 and/or a video camera 14. Radar sensor 12 is an FMCW radar that is installed at the front of the vehicle, for example, and is used for measuring the distances and relative velocities of vehicles driving ahead and of other obstacles on the roadway. Moreover, control unit 10 receives information from an on-board velocity sensor (not shown) about the intrinsic velocity of the vehicle equipped with the driver assistance system. When the relative velocity of an object located by radar sensor 12 conforms in terms of absolute value with the vehicle's own velocity, the control unit may ascertain that the located object is a stationary object, for example, a traffic sign or a guardrail post at the side of the road, or even an object such as a sewer cover or a stationary vehicle on the roadway.

Besides an ACC function (adaptive cruise control), where the velocity of the host vehicle is controlled as a function of the measured distance to the vehicle driving ahead, the driver assistance system described here has a further assistance function that resides in signaling a warning to the driver or actively initiating an emergency braking when there is a risk of a collision with an obstacle located by radar sensor 12. For this purpose, the assistance system also has an output unit 16 that is able to signal a warning to the driver via a human/machine interface having a display and/or a loudspeaker, and that, in some instances, also permits an active intervention into the brake system of the vehicle.

Thus, video camera 14 is installed in the vehicle in a way that allows it to monitor the near field thereof. The image information delivered by the video camera is analyzed in control unit 10 by an image-processing software and may be used in the context of a lane keeping assistance function, for example. Moreover, the data from video camera 14 make it possible to verify the data delivered by radar sensor 12 when this video camera has located an apparent obstacle. For example, if radar sensor 12 reports a stationary object on the roadway and indicates the approximate location of this object on the basis of the distance measurement, as well as the angular resolution thereof, the object present at this location may then be qualified more closely by analyzing the video image, and, in particular, the distinction may be made whether it is a real obstacle, such as a parking vehicle, for instance, or, however, an apparent obstacle, such as a sewer cover, for example, that does, in fact, trigger a radar echo, but may be easily driven over by the host vehicle.

Moreover, this control unit 10 communicates with a GPS-supported position-finding system (navigation system) 18 and an interface 20 to a mobile data network, as well as to a local database 22. If radar sensor 12 reports a stationary radar target on the roadway, but the target is not able to be verified as a real obstacle on the basis of the data from video camera 14, the current location of the host vehicle is then ascertained by position-finding system 18. Control unit 10 then prompts for this positional information to be stored in database 22. If the vehicle then travels the same route the next time, and radar sensor 12 again locates the apparent obstacle, it is then possible to omit the costly verification on the basis of data from video camera 14, and it is merely ascertained on the basis of the entry in database 22 that a radar target, which is not a true obstacle, is situated at this location. If there is a network connection via interface 20, the entry stored in local database 22 is then additionally communicated to an external database 24 that is stored on a server at a fixed installation location. In this manner, the information that a radar target is to be expected at the location in question and that does not represent a real obstacle, is not only made available to the host vehicle, but also to other vehicles.

Figure 2:
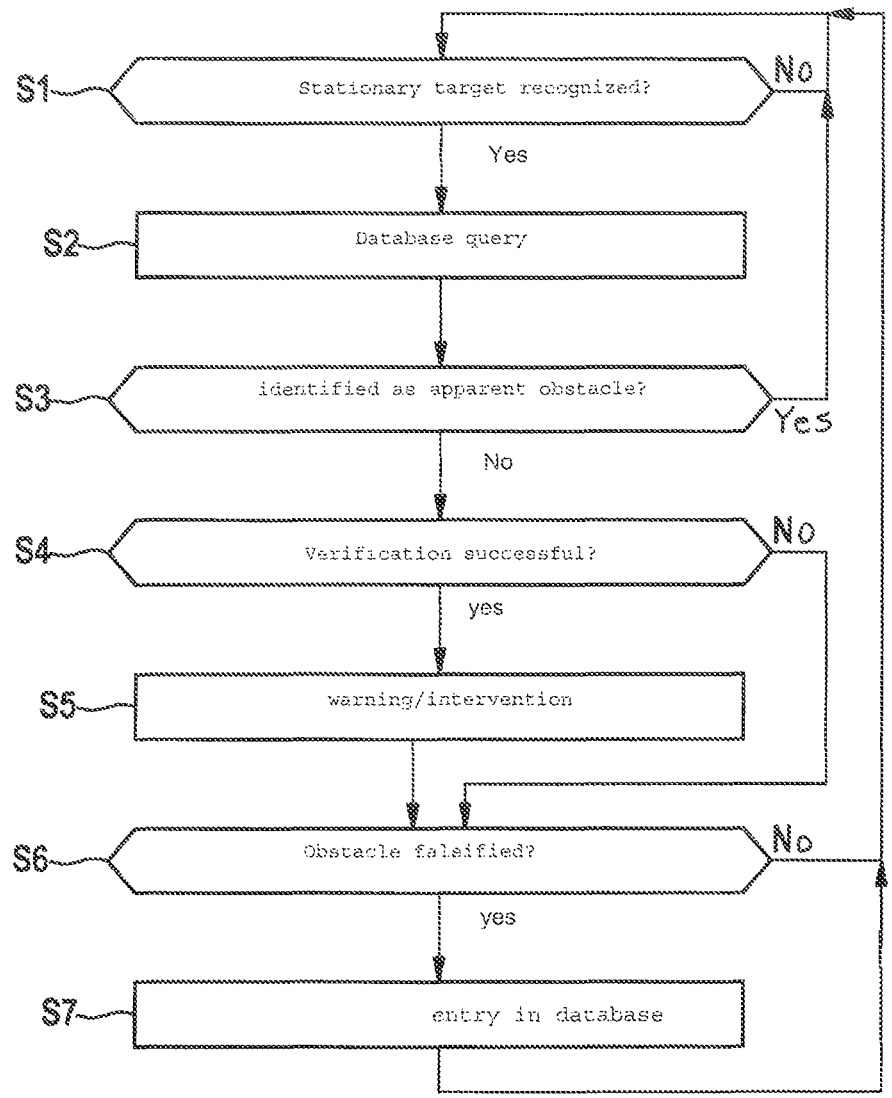
FIG. 2 shows a flow diagram for clarifying the principle of operation of the driver assistance system in the context of obstacle recognition.

FIG. 2 illustrates a typical method sequence on the basis of a flow diagram.

In step S1, control unit 10 ascertains whether a stationary target had been recognized in the driving path (i.e., in the predicted roadway) on the basis of the data delivered by radar sensor 12. As long as this is not the case, step S1 is periodically repeated in brief time intervals. If a stationary target is recognized, databases 22 and 24 are queried in step S2 as to whether an apparent obstacle is stored for the location where the vehicle is currently situated. Optionally, instead of the location of the host vehicle, it is also possible to store and query the location of the apparent obstacle itself that may be determined on the basis of the distance and directional data from the radar sensor.

If the database query reveals that an apparent obstacle is already stored for this location, the target currently located by the radar sensor in step S3 is identified as an apparent obstacle, and a return to step S1 follows.

If the radar target was not able to be identified as an apparent obstacle in step S3, the control unit performs a verification algorithm in step S4. The verification algorithm attempts to verify the recognized radar target, which must now be considered as a potential obstacle that is to be verified as a real obstacle on the basis of supplementary information from radar sensor 12 and/or video camera 14. If this verification is successful, and, moreover, if the distance and velocity data measured by the radar sensor for this obstacle reveal that there is reason to fear a collision, a warning is signaled to the driver via output unit 16. Depending on the urgency, an emergency braking may also be immediately activated in response to an intervention in the brake system.

If the apparent obstacle is not able to be verified in step S4, then step S5 is skipped.

Subsequently thereto, it is checked in step S6 whether the obstacle was falsified. If the verification was not successful in step S4, the falsification in step S6 may be performed, for example, in that the host vehicle drives over the apparent obstacle. It is thus established that it is not a real obstacle. In the same way, the obstacle is falsified if a warning had been signaled to the driver in step S5, but the driver ignored this warning, and the obstacle is then driven over. Furthermore, the obstacle is falsified in step S6 if an emergency braking had been actively triggered in step S5, but the driver has actively interrupted this braking action OR the obstacle is falsified in the case that a camera recognizes that there is no relevant target object (e.g. manhole cover).

If the obstacle had been falsified in step S6, an entry into databases 22 and 24 is made in step S7. In the simplest case, this entry is simply location information, thereby implying that an apparent obstacle is situated at this location. Depending on the specific embodiment, either the location coordinates of the located apparent obstacle are stored or, however, the location coordinates that the host vehicle had at the instant when the radar target was first located by the radar sensor.

In a modified specific embodiment, other information about the obstacle may also be stored in addition to the location data. For example, the type of apparent obstacle may also be specified more closely by analyzing the image delivered by the video camera, so that, in such situations, the relevant obstacle category may also be stored in the databases in addition to the location of the obstacle.

What is claimed is:

1. A method for distinguishing between real obstacles and apparent obstacles using a driver assistance system for a motor vehicle equipped with a position finding system for determining the motor vehicle's own location, as well as a radar sensor for measuring distances and relative velocities of radar targets, the method comprising:
    detecting a stationary radar target based on data from the radar sensor;
    determining that the detected stationary radar target is an apparent obstacle based on at least one of: (i) the motor vehicle drives over a location of the detected stationary radar target, (ii) the driver assistance system has initiated an emergency braking operation of the brake system of the motor vehicle based on the detected stationary radar target and a driver of the motor vehicle interrupts the emergency braking operation, (iii) a warning is issued based on the detected stationary radar target and the driver ignores the warning, and (iv) a camera detects that there is no relevant target object at the location of the detected stationary radar target; and
    storing, in a database, positional information for the detected stationary radar target determined to be an apparent obstacle;
    querying the database, by the driver assistance system, when the driver assistance system detects a first stationary radar target at a specific location, whether an apparent obstacle is at the specific location;
    determining that no apparent obstacle is at the specific location based on the querying; and
    at least one of issuing a warning signal and activating an emergency braking based determining that no apparent obstacle is at the specification location.

2. The method as recited in claim 1, wherein, when the querying of the database indicates that no apparent obstacle is at the specific location, subsequent to the querying of the database, a verification is performed in order to verify the first stationary radar target as a real obstacle on the basis of at least one of additional data from the radar sensor and data from an additional sensor.

3. The method as recited in claim 2, wherein the positional information of the detected stationary radar target determined to be an apparent obstacle is stored in a local database on board the motor vehicle.

4. The method as recited in claim 2, wherein the driver assistance system prompts for the positional information of the detected stationary radar target determined to be an apparent obstacle for storing in the database.

5. The method as recited in claim 2, wherein positional information of the first stationary radar target is stored in the database when the verification fails.

6. The method as recited in claim 5, wherein the detected stationary radar target is determined to be an apparent obstacle when the motor vehicle drives over the location of the detected stationary radar target.

7. The method as recited in claim 5, wherein the detected stationary radar target is determined to be an apparent obstacle when the driver assistance system has (i) activated the emergency braking operation of the brake system of the motor vehicle, and (ii) a driver interrupts the emergency braking operation.

8. The method as recited in claim 2, wherein the positional information of the apparent obstacles is stored in an external database which the driver assistance system uses to communicate with a wireless data network via an interface.

9. The method as recited in claim 2, wherein the warning is issued based on verifying that the first stationary radar target is a real object.

10. The method as recited in claim 2, wherein the emergency braking is activated based on verifying that the first stationary radar target is a real object.

11. The method as recited in claim 1, wherein the determining that no apparent obstacle is at the specific location includes verifying the first stationary radar target is a real obstacle on the basis of at least one of additional data from the radar sensor and data from an additional sensor.

12. The method as recited in claim 1, wherein the driver assistance system detects the first stationary radar target based on additional data from the radar sensor.

* * * * *